Sept. 7, 1965  H. C. LAWRENCE  3,204,897
VIBRATION DAMPING AND LOAD-SUPPORTING APPARATUS
Filed Oct. 25, 1962
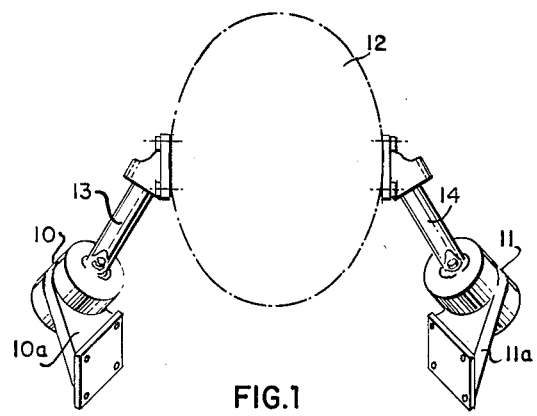
FIG.1
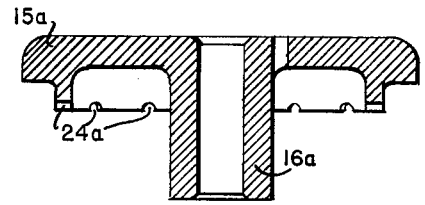
FIG.3
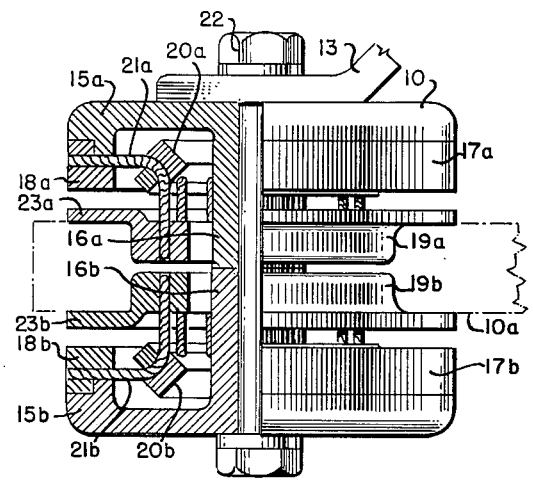
FIG.2
FIG.5
FIG.4
FIG.6

United States Patent Office 3,204,897
Patented Sept. 7, 1965

3,204,897
VIBRATION DAMPING AND LOAD-SUPPORTING
APPARATUS
Harold C. Lawrence, Pequannock, N.J., assignor to Aeroflex Laboratories Incorporated, a corporation of Delaware
Filed Oct. 25, 1962, Ser. No. 233,063
3 Claims. (Cl. 248—5)

This invention relates to vibration damping and load-supporting apparatus and, while it is of general application, it is particularly useful for supporting, from a nonvibratory base or platform, heavy loads subject to severe vibration in operation, for example light aircraft engines.

Heretofore, there have been proposed certain vibration damping and load-supporting apparatus including lengths of stranded wire cable or rope extending between two rectilinear clamping or securing strips, the support being provided by the stiffness of the short lengths of stranded cable. However, in such prior apparatus of this type, the damping of the vibrations has been effected primarily by supplementary elastic material such as rubber or synthetic plastic material having similar elastic properties. While such prior supporting apparatus have been satisfactory for relatively light loads, for example chassis of electronic apparatus mounted on a support subject to vibration, they have been found unsuitable for supporting, from a nonvibratory base or platform, heavy loads themselves subject to severe vibration in operation.

It is an object of the invention, therefore, to provide a new and improved vibration damping and load-supporting apparatus which is capable of supporting heavy loads while substantially isolating them from vibration.

In accordance with the invention, there is provided a vibration damping and load-supporting apparatus for interconnecting a supporting member and a supported member comprising two opposed supporting and damping sections, each including an annular element for connection to one of the members, a coaxial disc element for connection to the other of said members, and a plurality of lengths of stranded wire cable including portions extending essentially radially and portions extending essentially axially and individually secured at their opposite ends to the elements to be connected to the supporting and supported members, and means for rigidly securing the annular elements of the two opposed sections in opposition with the disc elements therebetween. The term "annular element" is used herein and in the appended claims to denote either a separate annular element or an annular portion integral with other forms. Similarly, the term "disc element" is used herein and in the appended claims to refer to a separate disc element or to a disc-like portion integral with other forms. The term "lengths of cable" is used herein and in the appended claims to include either separate severed lengths of cable or a continuous cable having separate active lengths.

For a better understanding of the present invention, together with other and further objects thereof, reference is had to the following description, taken in connection with the accompanying drawing, while its scope will be pointed out in the appended claims.

Referring to the drawing:

FIG. 1 is a schematic representation of two vibration damping and load-supporting apparatus embodying the invention applied to the suport of an aircraft engine;

FIG. 2 is a longitudinal view, partly in section, of a vibration damping and load-supporting apparatus embodying the invention;

FIG. 3 is a cross-sectional view of one of the elements of FIG. 2;

FIG. 4 is a cross-sectional view of a modified form of vibration damping and load-supporting apparatus, while FIGS. 5 and 6 are detail views illustrating the structure of FIG. 4 in intermediate stages of fabrication.

Referring now particularly to FIG. 1 of the drawing, there are represented two vibration damping and load-supporting apparatus 10 and 11 for supporting a load, such as a light aircraft engine 12, from a base or platform (not shown) to which are secured the brackets 10a and 11a of the apparatus 10 and 11, respectively. While, for the sake of clarity, only two supporting apparatus are shown, a minimum of three are usually required. The apparatus 10 and 11 are connected to the engine 12 by way of struts 13 and 14, respectively. In a support of the type shown, vibrational forces are transmitted from the engine 12 to the supporting brackets 10a, 11a in virtually all planes so that a universal damping and supporting apparatus is required.

Referring now to FIG. 2 of the drawing, there is illustrated a vibration damping and load-supporting apparatus for interconnecting a supported member, such as the strut 13, and a supporting member, such as the bracket 10a. This apparatus comprises two opposed supporting and damping sections which are identical so that only one section will be described in detail, its elements being identified by reference characters with the suffix "a," while the identical elements of the other section will be identified by the same reference characters with the suffix "b." The apparatus of FIG. 2 includes an annular element 15a for connection to the strut 13, as illustrated. The element 15a is a cup-like element including a central hub 16a and an annular inturned flange portion 17a. As illustrated, the portion 17a may be made up in part of an annular ring 18a fitting in telescope relation with the flange of the element 15a.

The damping and supporting apparatus of FIG. 2 further comprises a coaxial disc element 19a for connection to the bracket 10a and a coaxial floating ring element 20a. The apparatus further comprises a plurality of lengths of stranded wire cable including portions extending essentially radially and portions extending essentially axially and individually rigidly secured at their opposite ends to the annular element 15a and the dis element 19a. Specifically, these cable lengths are in the form of a plurality of L-shaped cable lengths 21a passing through the floating ring 20a, as shown and including portions extending essentially radially between, and individually secured at opposite ends to, the floating ring 20a and the annular portion 17a of the element 15a. The cable lengths 21a further include portions extending essentially axially between, and individually secured at opposite ends to, the floating ring 20a and the disc element 19a. For example, one method of fabrication which has been found suitable is to cast the cable lengths 21a in place in the annular ring 20a, the annular element 18a, and the disc element 19a, such casting being done by entirely conventional mold-casting processes, forming the cast metal portions 18a, 19a, and 20a.

The damping and supporting apparatus of FIG. 2 further comprises means for rigidly securing the two damping and supporting sections described in opposition with their central hubs 16a, 16b in abutment, as by a bolt 22. The disc element 19a has an axially spaced offset flange 23a, the space between the flanges 23a and 23b being proportioned to receive the bracket 10a. It is to be noted that there is a slight spacing between the disc elements 19a and 19b to provide for flexing of the apparatus in either direction axially without relying upon any axial elongation of the axially extending cable lengths.

In FIG. 3 is shown, in cross-sectional view, the cup-like element 15a showing half grooves 24a for receiving the radially extending cable lengths 21a which are cast into the ring 18a. The grooves 24a are preferably slightly undersize to assist in the clamping operation. The ring 18a may be secured to the flange of the element 15a by machine screws (not shown) or any equivalent means.

Referring now to FIGS. 4–6, inclusive, there is illustrated a modified form of vibration damping and load-supporting apparatus embodying the invention, component elements analogous to those in the construction of FIG. 2 being represented by corresponding reference numerals increased in number by 20. In this embodiment, the annular element 38a, forming a portion of the flange of the annular element 35a, includes a plurality of radially extending slots or holes 33a. The disc element 39a similarly includes a plurality of axially extending slots or holes 34a. The floating ring element 40a consists of two concentric mating rings 45a and 46a, each having semicircular undersize mating grooves through which the cable passes, the two rings being secured together by any suitable means such as the machine screws 47. In this embodiment, the cable is in the form of a continuous strand 48a which extends between the annular element 35a, the floating ring 40a, and the disc element 39a and is rigidly secured to each of these elements.

As shown more particularly in FIGS. 5 and 6, the continuous cable 48a may be formed into a series of horizontal loops and vertical loops by lacing it back and forth in the grooves between the retaining rings 45a and 46a. The horizontally extending loops then fit in slots or holes in the annular ring 38a while the vertical loops fit in slots or holes in the disc element 39a. The loops thus formed may be retained in place by locking roll pins 43 and 44.

From the foregoing description, it will be seen that there is provided by the invention a vibration damping and load-supporting apparatus which is capable of absorbing vibrational forces in any vertical plane as well as in a plane transverse to the axis of the apparatus. Small vertical forces are absorbed by the radially extending portions of the cables which, being clamped rigidly at either end, form effectively double cantilevers. Small deflections of these radial portions of the cables involve a relatively low effective spring constant. Larger vertical forces are absorbed by elongation of the radial portions of the cables and by compression of the axial portions of the cables, acting as columns. The transverse forces in any plane are similarly absorbed, the functions of the radially extending and axially extending cable portions being interchanged. Damping is due entirely to the interstrand friction of the cables and does not depend upon any supplementary resilient material.

In the form of the invention illustrated including the floating rings, there is no prestressing of the active portion of the cables, which are rigidly clamped both at each end and to the intermediate floating ring. In this case, the spring constant of the apparatus is determined by the active lengths of cable. In designing an apparatus of the type described, the objectionable vibration frequencies will be known as well as the mass of the supported body. The apparatus will be designed with a spring constant which, in association with a given mass, results in a natural resonant frequency substantially below the lowest vibration frequency to be isolated.

If a lower spring constant is desired, for example in supporting a lighter load, this may be obtained by segmenting the floating ring, while a still lower spring constant may be obtained by omitting the floating ring. In the latter case, the spring constant may or may not include a prestressing of the L-shaped cable lengths during their formation.

An important advantage of the supporting apparatus described is that they perform their load-supporting and vibration damping functions regardless of attitude or orientation, that is, the supported mass may be inverted vertically or tilted to any intermediate position without affecting the performance of the supporting apparatus. Many currently available vibration isolators are effective only when maintained in a fixed plane and lose their isolating capability when inverted or turned on their side, due to the phenomenon normally described as bottoming out against the isolator structure itself. The damping and supporting apparatus of the invention may be designed to accommodate a wide range of loads and vibration frequencies. One such design, which has proved satisfactory in the support of a light aircraft engine by four damping and supporting apparatus, involved a total load of 650 pounds. Such an apparatus included twelve radially extending and axially extending cable lengths, each of $3/_{32}$ inch, 7 x 19 stainless steel stranded cable, ¼ inch long.

While there has been described what is, at present, considered to be the preferred embodiment of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. A vibration damping and load-supporting apparatus for interconnecting a supporting member and a supported member comprising:
   (a) two opposed supporting and damping sections, each including
   (b) an annular element for connection to one of said members;
   (c) a coaxial disc element for connection to the other of said members;
   (d) a plurality of lengths of stranded wire cable including portions extending essentially radially and portions extending essentially axially and individually secured at their opposite ends to said elements;
   (e) and means for rigidly securing said annular elements of said two sections in opposition with said disc elements therebetween.

2. A vibration damping and load-supporting apparatus for interconnecting a supporting member and a supported member comprising:
   (a) two opposed supporting and damping sections, each including
   (b) an annular element for connection to one of said members;
   (c) a coaxial disc element for connection to the other of said members including an axially spaced offset flange;
   (d) a plurality of lengths of stranded wire cable including portions extending essentially radially and portions extending essentially axially and individually secured at their opposite ends to said elements;
   (e) and means for rigidly securing said annular elements of said two sections in opposition with said disc elements therebetween, the space between said flanges being proportioned for receiving said other of said members.

3. A vibration damping and load-supporting apparatus for interconnecting a supporting member and a supported member comprising:

(a) two opposed supporting and damping sections, each including
(b) a cup-like element for connection to one of said members including an annular portion and a central hub;
(c) a coaxial disc element for connection to the other of said members;
(d) a plurality of lengths of stranded wire cable including portions extending essentially radially and portions extending essentially axially and individually secured at their opposite ends to said elements;
(e) and means for rigidly securing said cup-like elements of said two sections together with said disc elements therebetween and with said central hubs in abutment.

References Cited by the Examiner

UNITED STATES PATENTS

| | | | |
|---|---|---|---|
| 2,583,948 | 1/52 | Keetch | 248—5 |
| 3,039,725 | 6/62 | Kerley | 248—20 |

FRANK L. ABBOTT, *Primary Examiner.*